Jan. 3, 1967   M. L. SCHOONMAN   3,295,254
APPARATUS FOR INJECTING LIQUIDS INTO TREES
Filed May 3, 1965   2 Sheets-Sheet 1

INVENTOR
MARTEN L. SCHOONMAN

BY *Clifton T Hunt Jr*

ATTORNEY

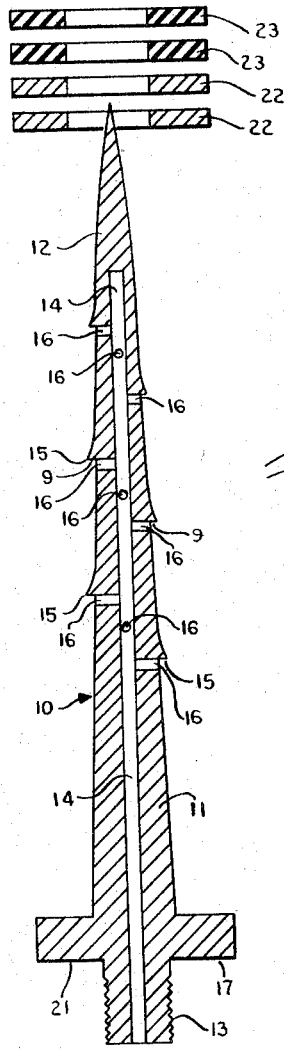
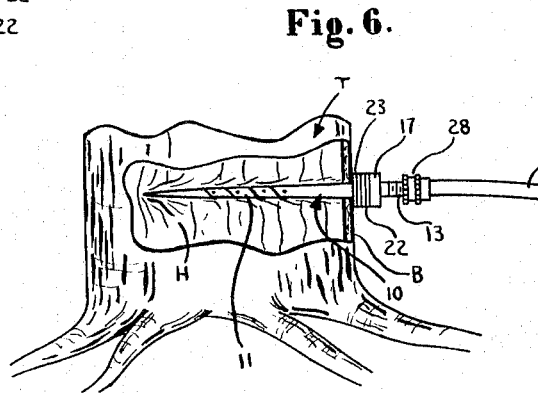
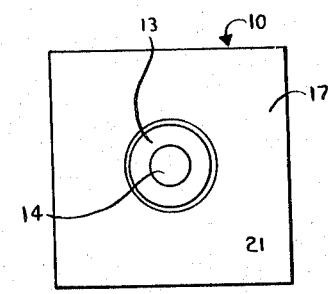
Fig. 6.
Fig. 5.
Fig. 3.
INVENTOR
MARTEN L. SCHOONMAN
BY
ATTORNEY United States Patent Office 3,295,254
Patented Jan. 3, 1967

3,295,254
APPARATUS FOR INJECTING LIQUIDS
INTO TREES
Marten L. Schoonman, Norwich Road,
Quaker Hill, Conn. 06375
Filed May 3, 1965, Ser. No. 452,764
7 Claims. (Cl. 47—57.5)

This invention relates to a method and apparatus for injecting liquids into trees.

It has long been known in the art of plant husbandry that trees may be injected with an appropriate liquid solution to supply the tree with water or nutrients or to treat the tree for disease. In most instances of the prior art, the apparatus used for injecting liquid into a tree requires a two-step operation in that a bore must first be drilled a suitable depth into the tree trunk, after which a nozzle is inserted in the bore and attached to the tree in a leak-proof manner. In such prior devices, the bore is of a slightly larger diameter than the nozzle in order that fluid emitted from the nozzle may fill the bore thereby obtaining a maximum area for absorption of the liquid by the capillary system of the tree. The making of a leak-proof connection between the nozzle and the bore frequently resulted in air being trapped in the bore about the nozzle. Such trapped air is objectionable because it tends to close the pores and passageways in the substance of the tree and to retard and delay the proper diffusion and transfer of the liquid from the point of introduction to remote parts of the tree.

Some prior attempts have been made to avoid the separate step of making a bore in the tree before inserting the nozzle and to avoid the danger of entrapping air in the relatively large diameter bore by providing a nozzle adapted to be driven or forced directly into the tree. This has proven objectionable because the fibers of the tree tend to be driven into the orifice or orifices of the nozzle thereby clogging them or to be jammed into such close proximity of said orifices as to obstruct the flow of fluid from the nozzle. Consequently, diffusion or transfer of liquid delivered from the orifices in the nozzle to remote portions of the tree is retarded because fluid absorption occurs only in the immediate area of the orifices of the nozzle.

It is therefore an object of this invention to provide a nozzle of novel construction and associated means for driving or forcing the nozzle directly into a tree while simultaneously defining an annular cavity in the tree about the nozzle through which fluid emitted from the nozzle comes in contact with a large number of fibers for dissemination through the tree's capillary system to remote parts of the tree.

It is a further object of the invention to provide a nozzle for introducing fluids to trees which is so constructed as to prevent the introduction of undesirable air into the annular cavity.

Another object of the invention is to provide means whereby a nozzle for introducing fluids into trees may be quickly and properly positioned in each of a plurality of trees and connected to a source of fluid pressure for delivering fluid, such as an anti-freeze solution, in an emergency situation. The fluid may be fed to the trees from a common fluid-pressure source or, alternatively, an individual pressurized fluid container may be connected to the nozzle of each tree.

Some of the objects of the invention having been stated, other objects will be apparent from the following description when taken in conjunction with the accompanying drawings, in which:

FIGURE 3 is an exploded longitudinal sectional view of the nozzle and its associated washers and adapter for use with a pressurized fluid container;

FIGURE 5 is an end elevation of the threaded outer end of the nozzle as shown in FIGURE 2 with the driving anvil removed;

FIGURE 6 is a perspective view of the nozzle positioned in a tree trunk and connected to a garden hose.

Figure 1:
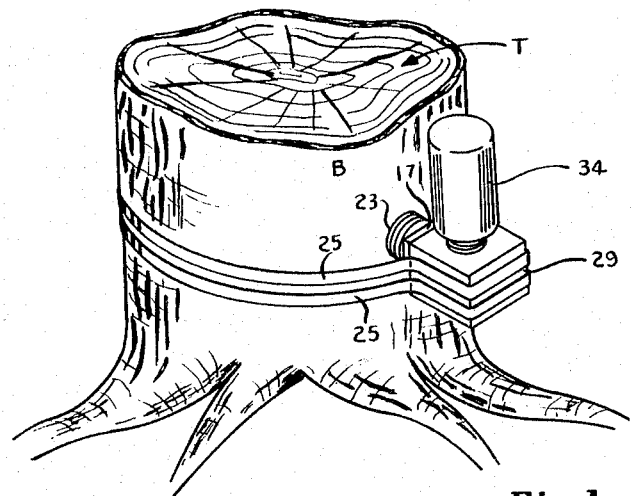
FIGURE 1 is a perspective view of the invention associated with a tree.

The improved fluid injection apparatus of this invention includes a fluid injection nozzle 10 comprising a shank 11 pointed at one end as at 12 and threaded at its other end 13 for connection to a source of fluid pressure. The shank 11 has an axial bore 14 spaced from the pointed end 12 and communicating with the atmosphere at the threaded end 13 of the shank 11. The shank 11 also includes longitudinally spaced centrally disposed projections 15 which are illustrated as an annular band extending spirally or helically about the mid-portion of the shank 11 and spaced from the pointed end 12 and the threaded end 13 of the shank. The projections 15 define shoulders 9 which extend radially between the outer tip of their respective projections 15 and the surface of the shank 11 and face away from the pointed end 12. A plurality of longitudinally spaced radial bores 16 extend from the axial bore 14 and communicate with the surface of the shank 11 at its juncture with the shoulder 9. The bores 16 are preferably arranged in staggered relation to each other and radiate outwardly in four directions from the axial bore 14 to facilitate dispersion of fluids into the circulatory system of the tree.

An annular collar or head 17 extends about and is preferably formed integral with the shank 11 at a point spaced inwardly from the end 13 of the nozzle 10. The collar or head 17 is preferably of angular configuration for the reception of a wrench or other suitable tool to aid in tightening and removing the nozzle from the tree when desired. The collar 17 also serves as a seat to receive the impact of blows directed against the nozzle 10 to drive or force it into a tree, the surface 20 of the collar 17 being adapted to receive the proximal surface 21 of a driving block or anvil 18. The block 18 includes a cavity 19 communicating with the surface 21 and adapted to receive the threaded end 13 of the nozzle 10 when the surface 21 of the driving block 18 is positioned against the seat or surface 20 on the collar 17. Upon being so positioned, blows from a hammer are directed against the end of the driving block 18 remote from the surface 21 to force the nozzle 10 into a tree.

Figure 2:
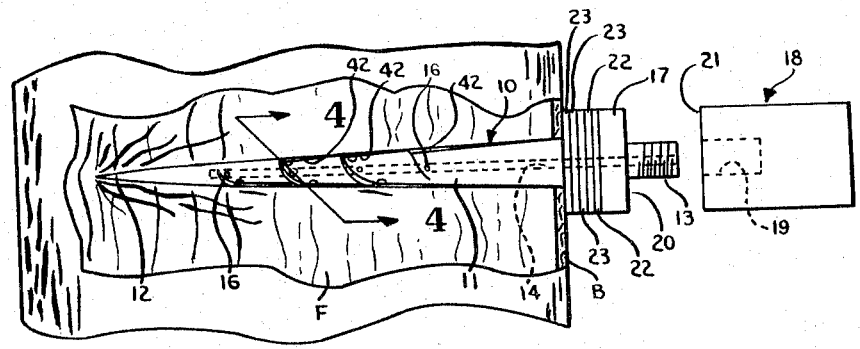
FIGURE 2 is a side elevation of the nozzle positioned in a tree, parts of which are broken away, and showing the driving anvil spaced from its seat on the collar of the nozzle.
Figure 4:
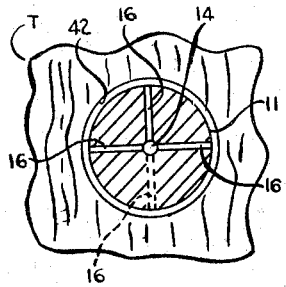
FIGURE 4 is a transverse sectional view taken substantially along the line 4—4 in FIGURE 2.

As indicated in FIGURES 2 and 4, it has been found desirable, except in the case of very large trees, to drive the nozzle 10 a sufficient distance into the trunk of a tree so that the pointed end 12 engages the heartwood H of the tree. Positioned in this manner, the group of projections 15 and their associated orifices 16 are located in the fibrous mass of the tree between the heartwood and the bark whereby fluid emitted from the nozzle may more readily enter the circulatory system of the tree. It is not so important that the pointed end 12 engage the heartwood as it is for the orifices 16 to be located in the circulatory system of the tree. Thus, in the case of very large trees, the end 12 may be spaced from the heartwood while the orifices 16 are properly located in the tree's circulatory system.

It will, of course, be necessary to provide nozzles of varying lengths to accommodate trees which vary greatly in diameter. However, the proper positioning of a single nozzle in trees of somewhat varying diameter may be effected through the use of a suitable number of spacers 22 and compressible washers 23 mounted on the shank 11 and positioned between the tree and the collar 17. The compressible washers 23 are adjacent the tree and are helpful in forming a leak-tight fit of the nozzle in the tree. The metal spacers 22 which bear against the inner surface of the collar 17 also facilitate relative rotational movement of the nozzle 10 relative to the compressible washers 23 as when the collar 17 is engaged with a wrench to turn the nozzle.

The effecting of a leak-tight connection is aided by the fact that the outermost orifice 16 in the group of orifices located at the medial portion of the nozzle is spaced inwardly from the surface of the tree a distance equal to about one-eighth of the diameter of the tree when the pointed end of the nozzle is in the heartwood. Consequently, no fluid is emitted from the nozzle adjacent the surface of the tree thereby minimizing the danger of fluid leaking outwardly about the nozzle at the surface of the tree. Such fluid leakage is further minimized by the provision of outwardly tapering or diverging walls in that portion of the shank 11 between the collar 17 and the proximal orifice 16. The degree of taper is such that the radial distance between the axial bore 14 and the juncture of the shank 11 with the collar 17 is greater than the radial distance between the axial bore 14 and the extremities of the projections 15.

After the nozzle 10 has been properly positioned in the tree trunk, as described above, the driving head or block 18 is removed from about the threaded end 13 of the nozzle and the end 13 is threadably connected to a suitable source of fluid pressure. The threads on the nozzle are preferably adapted to mate with the threads of an ordinary garden hose such as shown at 26, whereby a conventional garden hose may be attached to the nozzle 10 to provide communication between the nozzle and any suitable fluid supply such as a water spigot or a fluid pressure tank, not shown. Desired chemicals may be introduced into the water for delivery to the tree for combatting disease, providing nourishment to the tree, and the like.

The invention also contemplates the use of the nozzle with pre-packaged pressurized cartridges provided with a membrane seal adapted to be punctured as the cartridge is attached to the nozzle. Such an arrangement is illustrated in FIGURE 3. After the driving head 18 has been removed from about the threaded end 13 of a nozzle positioned in a tree a compressible washer 23a is preferably seated against the surface 21 of the collar 17. An adapter 29 having a first threaded bore 30 is threadably engaged with the threaded end 13 of nozzle 10 to compress the washer 23a between the surface 31 of adapter 29 and the surface 21 of the collar 17 to provide a fluid-tight seal. The adapter 29 has a second threaded bore 32 preferably extending in right angular relation to the threaded bore 30 and communicating with a surface of the adapter 29 in right angular relation to the surface with which the bore 30 communicates.

The second threaded bore 32 is adapted to receive the externally threaded neck portion 33 of a pressurized fluid container 34 closed by a membrane or pressure seal 35. As shown in FIGURE 1, the container 34 is supported in inverted upright position when engaged with the bore 32 of adapter 29.

A hollow needle 36 rises from the base of the internally threaded bore 32 and terminates adjacent the surface of the adapter 29. The bore 39 of the hollow needle 36 is communicatively connected by a channel 38 with the bore 30, and thus with the bore 14 in the nozzle 10. The bore 39 in the hollow needle 36 terminates in apertures 40 adjacent the pointed end of the needle 36 through which fluid from the container 34 passes to the nozzle and thence to the tree after the needle has punctured the membrane 35. The membrane 35 is recessed from the end of the neck 33 so that the container 34 will be partially threadably connected to the adapter before the membrane is punctured by the needle 36. A fluid-tight seal between the pressurized fluid container 34 and the adapter 29 is provided by compressible washers 23b disposed in the bore 32 about the hollow needle 36.

As previously noted, the group of longitudinally spaced radial bores 16 are located in the mass of fluid-carrying fibers F which make up the capillary system of the tree. As most clearly seen in FIGURES 2 and 4, the projections 15 force the fibers F away from the surface of the nozzle 10 as the nozzle is driven into the tree with the result that the displaced fibers adhere to the adjacent undisturbed fibers to define a cavity 42 extending about the surface of the nozzle 10 with which the radial bores 16 communicate. The cavity 42 permits fluid emitted from the bores 16 to reach fibers F located remote from the bores 16 thereby facilitating dispersion of the fluid to remote portions of the tree. The effective length of the cavity 42 is co-extensive with the distance between the distal projections 15 and their associated radial bores 16. Fluid from the pressurized container 34 or other source is consequently fed to a corresponding area of the fluid-carrying fibers in the tree.

Any desired chemicals may be packaged within the fluid container 34, but the ease and rapidity with which the apparatus may be installed in a tree renders the invention particularly useful in protecting trees against frost damage by injecting an anti-freeze solution when freezing weather is imminent. An example of an anti-freeze solution which has proven satisfactory is the mixture of two ounces of pure grain alcohol with one pint of water. The strength of the solution can be increased to equal amounts of pure grain alcohol and water without adversely affecting the tree. The quantity of anti-freeze solution to be fed to a given tree depends upon its size. Experiments indicate that one quart would protect an average sized mature orange tree from damage when subjected to temperatures of about 25° F. overnight. The anti-freeze solution is forced into the tree at pressures of between five to twenty-five pounds per square inch, pressure in the range of five to fifteen pounds per square inch being generally satisfactory. At this pressure, a protective quantity of anti-freeze can be injected into a tree within two or three hours.

The use of the pre-packaged pressurized container 34 to feed desired chemicals into a tree also lends itself for application of desired coloring matter to the tree because of the ability to carefully control the pressure and the amount of chemicals fed into the tree through use of the pressurized container. Extremely vivid and decorative coloring effects have been obtained on living trees through the use of coal tar colorants. Any water soluble inert coloring matter can be satisfactorily used. The stronger the mixture, as judged by the color of the solution, the better the effects. When fed under pressures described above, traces of the coloring could be seen in the foliage of the tree after about forty-eight hours.

Disease-killing organisms and nutrients can also be pre-packaged in the pressurized fluid containers. In fact, the pressurized fluid container in combination with the novel nozzle of the invention lends itself for use with any installation where a quick injection of fluid into the tree is desirable. For prolonged pressure treatment of the tree, it may be found desirable to utilize straps 25 extending about the tree and the nozzle or adapter to more securely bind the nozzle to the tree in a leak-tight manner.

The nozzle may be removed from the tree by disconnecting the fluid supply, removing the adjustable bands 25, if any, and rotating the collar 17 as by a wrench to loosen the nozzle within the tree, after it may be pulled from the tree, the tapered portion between the collar 17 and the group of orifices 16 being helpful in this connection.

The self-contained pressurized units are also ideally suited for multiple applications to a single tree. In the event it is desired to position a plurality of nozzles in a single tree, it is desirable to locate the devices at different elevations along the trunk of the tree and at spaced points about the tree's circumference. In this connection, it is noted that better results are obtained by inserting a nozzle or nozzles near the bottom of a tree.

Although the invention has been described in specific terms, it will be understood that numerous changes can be made without departing from the spirit of the invention, the scope of the invention being defined in the claims.

I claim:
1. A nozzle for injecting fluid in a tree comprising:
   (a) an elongated shank pointed at one end;
   (b) said shank having an axial bore communicating with the end of the shank remote from the pointed end;
   (c) a series of longitudinally spaced projections extending radially from the surface of the shank and defining shoulders facing away from the pointed end of the shank and extending radially between the outer tips of their respective projections and the surface of the shank; and
   (d) said shank also having a radial bore extending between and providing communication between the axial bore and the surface of the shank at its juncture with at least one shoulder at a portion thereof, said shoulder portion extending perpendicularly from the longitudinal axis of the shank.

2. A structure according to claim 1 wherein means are provided adjacent the end of the shank remote from the pointed end for driving the shank in a tree.

3. A structure according to claim 2 wherein said means includes:
   (a) an annular collar extending about the shank and spaced from its said end remote from the pointed end; and
   (b) a driving block having a cavity communicating with one surface of the block and adapted to loosely receive said last-named end of the shank with the said one surface of the driving block seated against the collar whereby the nozzle may be driven into a tree.

4. A structure according to claim 3 wherein said last-named end of the shank is threaded for releasable connection to a source of fluid pressure.

5. A structure according to claim 4 which also includes:
   (a) a pressurized fluid container closed by a membrane;
   (b) an adapter providing communication between the nozzle and the fluid container;
   (c) said adapter including means for puncturing the membrane in the container.

6. A structure according to claim 5 wherein said adapter includes first and second sides and has:
   (a) a first recess communcating with the first side of the adapter and engageable with the end of the shank with which the axial bore communicates;
   (b) a second recess communicating with the second side of the adapter and extending in perpendicular relation to the first recess, asid second recess being engageable with the container adjacent said membrane;
   (c) a hollow needle seated in said second recess for puncturing the membrane; and
   (d) a channel communicating with the hollow needle and the first recess whereby fluid is delivered from the container to the nozzle.

7. Apparatus for introducing fluid to the capillary system of a tree comprising:
   (a) an elongated shank pointed at one end to be driven in a tree;
      (i) said shank having an axial bore spaced from the pointed end of the shank and communicating with the other end of the shank,
      (ii) an annular projection extending radially and helically from the surface of the shank and defining a shoulder facing away from the said pointed end of the shank and extending radially between the tip of the projection and the surface of the shank,
      (iii) said shank having a plurality of variously directed radial bores each communicating with the axial bore and the surface of the shank at its juncture with the shoulder,
      (iv) an annular collar fixed to the shank in spaced relation from said other end of the shank,
      (v) said helically extending annular projection being spaced inwardly from the pointed end of the shank and from the annular collar; and
   (b) a driving block having a cavity to loosely receive said other end of the shank and engageable with the collar to drive the shank into a tree.

References Cited by the Examiner
UNITED STATES PATENTS 2,044,063  6/1936  Dahlberg _____ 47—57.5
3,124,904  3/1964  Mauget _____ 47—57.5

FOREIGN PATENTS 316,637  12/1956  Switzerland.

ABRAHAM G. STONE, *Primary Examiner.*

R. E. BAGWILL, *Assistant Examiner.*